Figure 1:
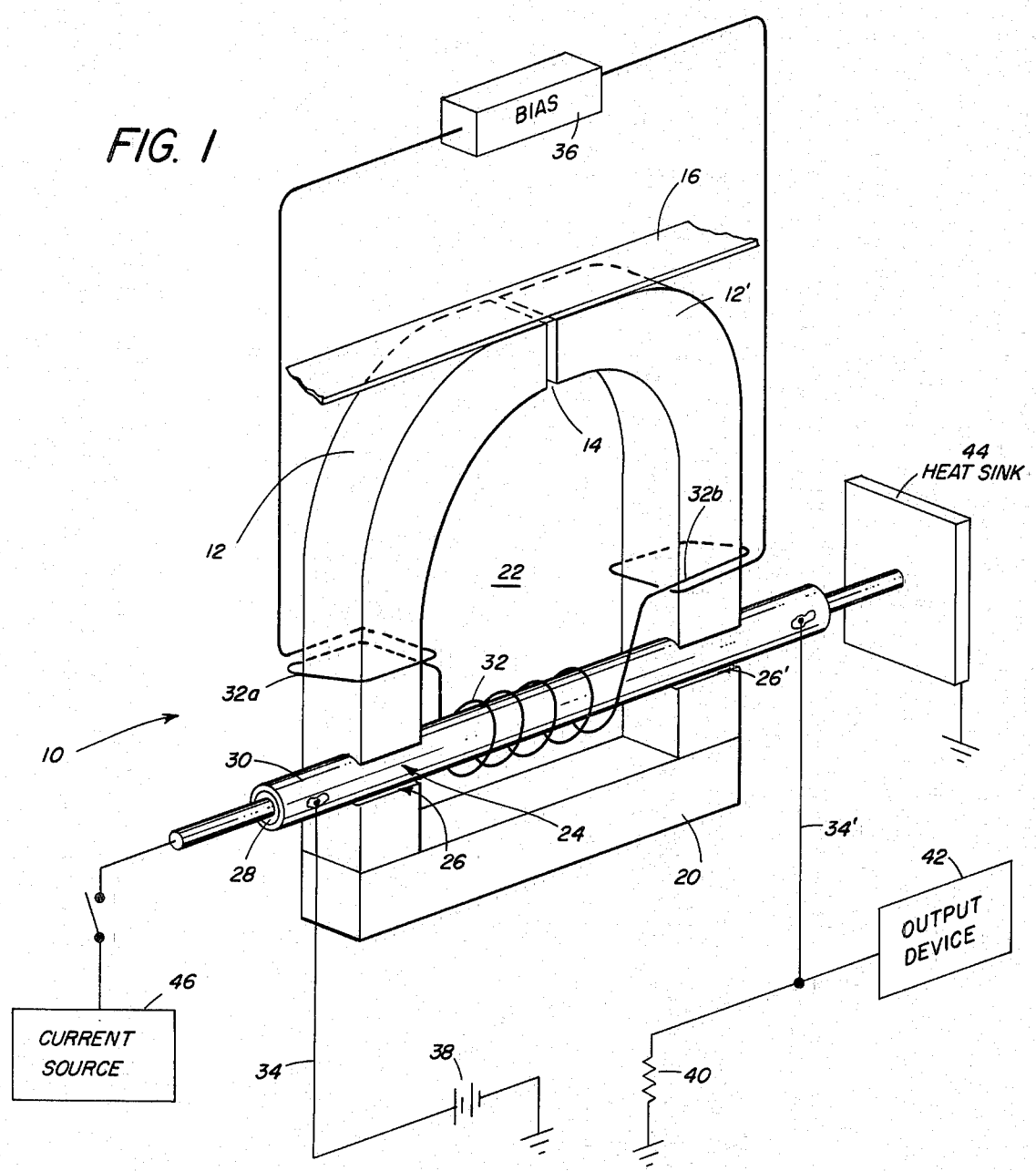

United States Patent [19] [11] 4,164,770
Jeffers [45] Aug. 14, 1979

[54] THIN FILM MAGNETORESISTIVE HEAD
[75] Inventor: Frederick J. Jeffers, Escondido, Calif.
[73] Assignee: Eastman Technology, Inc., Rochester, N.Y.
[21] Appl. No.: 835,109
[22] Filed: Sep. 21, 1977
[51] Int. Cl.² .............................................. G11B 5/30
[52] U.S. Cl. .................................... 360/113; 360/111; 324/249
[58] Field of Search .............. 360/113, 111, 123, 125; 324/249

[56] References Cited
U.S. PATENT DOCUMENTS

| | | |
|---|---|---|
| 3,239,754 | 3/1966 | Odom, Jr. et al. .............. 324/249 X |
| 3,242,269 | 3/1966 | Pettengill ............................. 360/111 |
| 3,369,083 | 2/1968 | Clapper et al. .................. 360/122 X |
| 3,400,328 | 9/1968 | Penn et al. ............................ 324/249 |
| 3,443,213 | 5/1969 | Bader et al. ........................ 324/43 R |
| 3,829,894 | 8/1974 | Watanabe et al. .................... 360/111 |

Primary Examiner—John H. Wolff
Attorney, Agent, or Firm—Robert F. Cody

[57] ABSTRACT

A flux sensitive magnetic head is disclosed wherein a thin single domain magnetic film coated on a non-conductor bridges the head gap. A magnetic bias is applied to the hard axis of the film; and flux entering the gap causes the resistivity of the film to vary about a resistance reference established by the bias. The resistance variation is converted to a useful signal corresponding to the flux entering the gap.

4 Claims, 2 Drawing Figures

U.S. Patent

Aug. 14, 1979

4,164,770

THIN FILM MAGNETORESISTIVE HEAD

BACKGROUND OF THE INVENTION

1. Field of the Invention

This invention relates in general to magnetic heads and in particular to a magnetoresistive head.

2. Description Relative to the Prior Art

Conventional playback of information recorded on a magnetic storage medium involves use of a magnetic playback head of the type that is responsive to the rate of change of signal flux contained in the storage medium. Because of their flux rate-of-change dependency, such playback heads cannot be used effectively for playback of low frequency recorded information and-/or when the relative speed of travel between the head and medium is low.

The magnetoresistivity of thin single domain films has been discussed by Hunt in IEEE Transactions on Magnetics, Vol. MAG7, #1, page 150, March 1971. Basically, Hunt utilized the magnetoresistance phenomenon exhibited by "ferromagnetic" thin films. Drawing on the work of Hunt, the invention, as will appear below, specially configures a thin magnetic film, and adapts such magnetic film to a flux sensitive head, doing so in a way that permits various advantageous procedures to be employed.

SUMMARY OF THE INVENTION

At the heart of the invention is a generally cylindrical (or similar) single domain magnetic film on an electrically non-conductive tube, the easy axis of the film being circumferential about the axis of the tube. A coil for carrying a flux-producing bias current wraps around, and is electrically insulated from, the film supporting tube. The tube, with coil thereon, bridges the gap of a magnetic head; and the bias field causes a "tilt", in the magnetization of the film, from its easy axis. As signal flux enters the head gap, it causes the magnetization "tilt" to increase and decrease in response therewith; this causes the resistance of the film to vary in accordance with the signal flux. By passing a quiescent current through the film the level of signal flux may be determined from current variations through the film.

Because of the hollowness of the film supporting tube, an electrical thermal conductor may be accommodated within the tube hollow: the electrical conductivity of which may be used to advantage to rid the film of domain walls prior to signal-flux sensing; and the thermal conductivity of which may be used to drain off heat generated by the current through the film.

In a presently preferred form of the invention, the bias coil is appropriately wrapped around the head pole pieces which define the head gap, thereby to produce countermagnetomotive forces (mmf) to cancel any mmf which may appear across the head gap as a result of the bias current.

Figure 2:
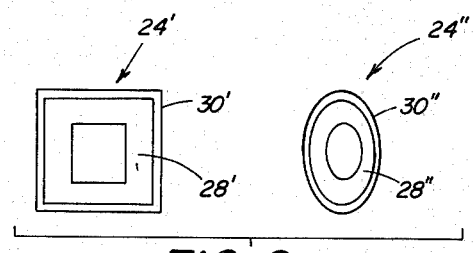

The invention will now be described with reference to the figures, wherein:

FIG. 1 is a partially schematic perspective showing of apparatus embodying the invention, and FIG. 2 depicts diagrams useful in describing the invention.

Referring to FIG. 1, a magnetic head 10 according to the invention has a pair of (ferrite or similar) pole pieces 12, 12', which cooperate to define a transducer gap 14 for reading magnetically recorded signal information on magnetic tape 16. The pole pieces 12, 12' are structurally supported by a non-magnetic back bar 20, thereby forming a window 22 in the head 10. A sensor element 24 is so bonded in notches 26, 26' in the pole pieces 12, 12' that the sensor element bridges the window 22 of the head 10. The sensor element 24 is comprised of a tubular, electrically non-conductive element 28 having a thin single domain magnetic film 30 thereon. The magnetic film 30 has an easy axis of magnetization that is circumferential about the longitudinal axis of the tubular element 28.

Before proceeding further with a description of the head 10, it is considered desireable at this point to discuss one way to fabricate the sensor element 24: To provide such sensor element, a tube (28) of glass with an outer dimension of, say, between 5 and 9 mils, and with an electrically conductive wire threaded through it, is imersed in an electroless plating bath containing 80-20 Ni Fe to form a magnetic film of about 250 A on the tube. During plating, a current is passed through the wire, thereby to align the film easy axis circumferentially of the tube. Then the wire is (or may be) removed.

Turning again to FIG. 1, a coil 32 wraps around the tubular sensor element 24 and electrical leads 34, 34' are bonded to the film 30 on the element 24. A dc bias is applied to the coil 32 by a bias source 36, thereby to "tilt" the magnetization vector; and a quiescent current is passed through the film 30 by means of a source 38.

Before addressing preferential refinements of the invention, consider a sine wave of signal flux from the tape 16 entering the gap 14 and traversing the pole piece 12, the thin film 30, the pole piece 12', and back to the tape. Since both the bias flux (32) and the signal flux are hard-axis applied, the film dipoles experience coherent "tilting". Such coherent "tilting" steepens and generally straightens the magnetoresistivity vs hard-axis flux curve which is essential for sensitivity and linearity in the practice of the invention. When the sine wave signal flux increases the "tilt" of the quiescent magnetization vector, the current through a resistor 40 increases; and when the sine wave signal flux decreases the "tilt" of the quiescent magnetization vector, the current through the resistor 40 decreases. Such current variations appear as voltage inputs to a device 42 . . . which is to say that flux variations in the tape 16 are converted to and read as voltage variations across the resistor 40.

Now as to refinements to the basic invention, it will be noted that, since the thin film 30 is a current carrier, a fair degree of heat may be produced in the element 24. To avoid a heat buildup (which may adversely influence the behavior of the film 30) a good thermal conductor such as copper may be threaded through the core of the tube 28, and connected to a heat sink 44.

Next, by electrically grounding the heat sink 44, a "set" current may be briefly applied from a source 46 to sweep away any domain walls which may reside in the film 30.

The application of a bias current through the coil 32 has the effect of causing an mmf across the gap 14 which may adversely affect the recording on the tape 16, and the playback thereof. To nullify any chance of such adverse behavior, the invention, aside from the various teachings above, provides for one or more windings (32a, b) about the pole pieces which serve as sources of bucking mmf's. Thus, by means of windings 32a, b the bias winding 32 is magnetically isolated from the gap 14, as is desired.

The invention is described with particular reference to a preferred embodiment thereof, but it will be understood that variations and modifications can be made within the spirit and scope thereof. For example, although FIG. 1 depicts a sensor element 24 having a generally circular crosssection, other tube crosssections are possible for practicing the invention. See FIG. 2 which shows square and eliptical tube crosssections.

What is claimed is:

1. In a magnetic playback head of the type having:
   (a) a pair of magnetic means for defining a transducer gap, and
   (b) means for producing a signal proportional to flux entering said gap, the improvement wherein said signal producing means comprises:
   (a) an elongated element connected across said gap, said element being comprised of an electrically non-conductive support and a thin single domain magnetic film coextensively formed thereabout, the easy axis of said film being about the longitudinal axis of said element and in a plane that is perpendicular to said longitudinal axis,
   (b) means for applying a magnetic bias generally in the direction of the longitudinal axis of said element, so as to tilt the easy axis of said film in the direction of the hard axis of said film and
   (c) means for detecting resistance changes of said film due to changes in the degree of tilt, said tilt being a function of the flux entering said gap, whereby flux patterns in a magnetic medium with which said head cooperates are directly measurable by virtue of said changes in resistance.

2. The apparatus of claim 1 wherein said elongated element has a longitudinal hollow central portion hollow, said hollow central portion having an electrically conductive element therewithin.

3. The apparatus of claim 2 including means for applying a current through the conductive element within said hollow portion, and heat sink means connected to said electrically conductive element, so as to dissipate heat from said thin film through said electrically non-conductive support.

4. The apparatus of claim 1 wherein said means for applying a bias is a coil wound about said elongated element.

* * * * *